US008965638B2

(12) United States Patent
Ries et al.

(10) Patent No.: US 8,965,638 B2
(45) Date of Patent: Feb. 24, 2015

(54) VIBRATORY FREQUENCY SELECTION SYSTEM

(75) Inventors: Michael W. Ries, Coon Rapids, MN (US); Ryan P. Lenton, Buffalo, MN (US); Ryan J. Nelson, Maple Grove, MN (US)

(73) Assignee: Caterpillar Paving Products, Inc., Brooklyn Park, MN (US)

(*) Notice: Subject to any disclaimer, the term of this patent is extended or adjusted under 35 U.S.C. 154(b) by 616 days.

(21) Appl. No.: 13/173,856

(22) Filed: Jun. 30, 2011

(65) Prior Publication Data

US 2013/0006483 A1 Jan. 3, 2013

(51) Int. Cl.

| | |
|---|---|
| ***G06F 19/00*** | (2011.01) |
| ***E01C 19/28*** | (2006.01) |
| ***B06B 1/16*** | (2006.01) |
| *E02D 31/00* | (2006.01) |

(52) U.S. Cl.

CPC ............... *E01C 19/282* (2013.01); *B06B 1/161* (2013.01); *E01C 19/286* (2013.01); *E02D 31/002* (2013.01)

USPC ............................................................ 701/50

(58) Field of Classification Search

CPC ... E01C 19/00; E01C 19/002; E01C 19/2015; E01C 19/2035; E01C 19/22; E01C 19/233; E01C 19/28; E01C 19/286; E01C 19/288; E01C 19/41; E01C 19/488; B06B 1/161

USPC ............................................ 701/50; 404/117

See application file for complete search history.

(56) References Cited

U.S. PATENT DOCUMENTS

| | | | | |
|---|---|---|---|---|
| 3,656,419 | A | | 4/1972 | Boone |
| 3,867,073 | A | | 2/1975 | Barrett et al. |
| 4,586,847 | A | | 5/1986 | Stanton |
| 4,759,659 | A | * | 7/1988 | Copie ........................... 404/117 |
| 5,618,133 | A | | 4/1997 | Mitsui et al. |
| 5,727,900 | A | | 3/1998 | Sandstrom |
| 6,224,293 | B1 | | 5/2001 | Smith |
| 6,516,679 | B2 | | 2/2003 | Yates et al. |
| 6,551,019 | B1 | | 4/2003 | Mötz et al. |
| 6,551,020 | B2 | | 4/2003 | Swanson et al. |
| 6,558,072 | B2 | | 5/2003 | Staffenhagen et al. |
| 6,619,125 | B2 | | 9/2003 | Laugwitz |
| 6,717,379 | B1 | | 4/2004 | Andersson |
| 6,722,815 | B2 | | 4/2004 | Fervers |
| 6,742,960 | B2 | | 6/2004 | Corcoran et al. |
| 6,829,986 | B2 | | 12/2004 | Richter |
| 7,089,823 | B2 | | 8/2006 | Potts |

(Continued)

FOREIGN PATENT DOCUMENTS

| | | |
|---|---|---|
| JP | 01260107 | 10/1989 |

*Primary Examiner* — Jerrah Edwards

(74) *Attorney, Agent, or Firm* — Miller, Mathias & Hull LLP

(57) ABSTRACT

A controller for use in a vibratory work machine may include a vibratory frequency selection system having a user interface with a discrete amplitude selection input device and a discrete frequency selection input device. The controller may receive a frequency selection signal from the frequency input device and generate a frequency control signal having a characteristic corresponding to the frequency setting of the input device. The controller may also receive an amplitude selection signal from the amplitude input device and output at least the frequency control signal to cause a vibrator mechanism of the machine to generate vibrations having a frequency and amplitude corresponding to the settings of the input devices.

15 Claims, 7 Drawing Sheets

(56) References Cited

U.S. PATENT DOCUMENTS

| | | | | |
|---|---|---|---|---|
| 7,674,070 | B2 | 3/2010 | Fluent et al. | |
| 2003/0082001 | A1 | 5/2003 | Potts | |
| 2003/0223816 | A1* | 12/2003 | Potts | 404/117 |
| 2008/0092725 | A1 | 4/2008 | Simula et al. | |
| 2010/0172696 | A1 | 7/2010 | Commuri | |

* cited by examiner

VIBRATORY FREQUENCY SELECTION SYSTEM

TECHNICAL FIELD

This disclosure relates generally to controlling vibrator mechanisms of vibratory work machines and, more particularly, to control systems and methods that provide multiple discrete combinations of vibration frequencies and amplitudes in a vibrator mechanism.

BACKGROUND

Vibratory work machines such as, for example, vibratory compactors, are well known. Typically, vibratory work machines such as compactors for soil, gravel, asphalt or the like include vibrator mechanisms that are configured to provide one or more frequency settings as well as one or more amplitude settings. In operation, the vibration amplitude and vibration frequency of a vibratory compactor may be varied by a user to suit a particular application. For example, the vibration amplitude and frequency suitable for compacting gravel for a road may be different from the vibration amplitude and frequency suitable for compacting soil for a footpath.

Typically, vibratory compactors include vibrator mechanisms that produce vibrations using two or more weights that rotate about a common axis. The weights are eccentrically positioned with respect to the common axis and are typically movable with respect to each other about the common axis to produce varying degrees of imbalance during rotation of the weights. As is commonly known, the amplitude of the vibrations produced by such an arrangement of eccentric rotating weights may be varied by positioning the eccentric weights with respect to each other about their common axis to vary the average distribution of mass (i.e., the centroid) with respect to the axis of rotation of the weights. As is generally understood, vibration amplitude in such a system increases as the centroid moves away from the axis of rotation of the weights and decreases toward zero as the centroid moves toward the axis of rotation. It is also well known that varying the rotational speed of the weights about their common axis may change the frequency of the vibrations produced by such an arrangement of rotating eccentric weights.

In one known type of vibratory mechanism, the eccentric weights may be held in position relative to each other during use of the vibrator mechanism, but a fluent mass such as metallic shot, metal members, steel balls, liquid metal, sand or other shiftable ballast material disposed within a chamber to vary the amplitude of the vibrations. One example of this type of vibratory mechanism is provided in U.S. Pat. No. 4,586,847 to Stanton, the disclosure of which is incorporated by reference herein. The chamber is configured so that the fluent mass shifts within the chamber as the eccentric weight rotates in either the clockwise (CW) or counter clockwise (CCW) direction so that the fluent mass is located adjacent an eccentric weight when a shaft rotates in one direction of rotation, and is located diametrically opposite the eccentric weight when the shaft rotates in the opposite direction of rotation. The shifting of the fluent mass disposes the centroid of the eccentric weights at two different positions and, correspondingly, creates two different vibratory amplitudes based on the direction of rotation. In typical implementations, the vibratory motor provides the same frequency for rotation in both the CW and CCW directions (one vibration frequency with two amplitudes), or one frequency in the CW direction and a different frequency in the CCW direction (two vibration frequency/amplitude combinations). Consequently, the vibratory compactor is limited to two vibration characteristics.

Other types of vibration frequency and amplitude control strategies exist in the art. For example, U.S. Pat. No. 7,089,823 to Potts provides a speed control system wherein the vibration frequency is determined based on the amplitude selected by the operator of the vibratory work machine. A controller of the vibratory mechanism includes an amplitude control circuit that generates an amplitude control signal that varies from a minimum value to a maximum value. The vibratory mechanism is adapted to vibrate at an amplitude based on an amplitude control signal characteristic. Additionally, the controller includes a frequency control circuit that is operatively coupled to the amplitude control circuit to produce a frequency control signal that varies based on the amplitude control signal characteristic. Consequently, operator selects the amplitude of the vibrations, and the controller determines the corresponding frequency of the vibrations based on its programming. The operator is not provided with independent control of the frequency such that one vibration frequency for each vibration amplitude that can be set by the operator.

In view of this, a need exists for providing a vibrator mechanism control system in which an operator may select for multiple available discrete combinations of vibration frequencies and amplitudes of a vibrator mechanism.

SUMMARY OF THE DISCLOSURE

In one aspect of the present disclosure, the invention is directed to a controller for use in a vibratory work machine. The controller may include a frequency signal generation routine that may include receiving a frequency selection signal from a first user adjustable input device indicative of a setting of the first input device at one of a plurality of discrete frequency settings, and generating a frequency control signal having a characteristic corresponding to a frequency setting of the frequency selection signal. The controller may also include a frequency signal output routine that may include receiving an amplitude selection signal from a second user adjustable input device indicative of a setting of the second input device at one of a plurality of discrete amplitude settings, determining an amplitude setting of the second input device based on the received amplitude selection signal, and outputting at least the frequency control signal from the controller to a power source of the vibratory work machine to cause a vibrator mechanism of the vibratory work machine to generate vibrations having a vibration frequency corresponding to the frequency setting of the frequency selection signal and a vibration amplitude corresponding to the amplitude setting of the amplitude selection signal.

In another aspect of the present disclosure, the invention is directed to a vibratory frequency selection system for a vibratory work machine. The vibratory frequency selection system may include a first input device for selecting from a plurality of discrete frequency settings and generating a frequency selection signal indicative of a frequency setting of the first input device, a second input device for selecting from a plurality of discrete amplitude settings and generating an amplitude selection signal indicative of an amplitude setting of the second input device, a power source, a vibrator mechanism operative connected to the power source, and a controller operative connected to the first input device, the second input device and the power source. The controller may be configured to receive the frequency selection signal from the first input device and to generate a frequency control signal having characteristic corresponding to the frequency setting of the frequency selection signal, and to receive the amplitude selection signal from the second input device and to determine a vibration amplitude corresponding to the amplitude setting of the frequency selection signal. The controller may further be configured to output at least the frequency control signal to the power source to cause the power source to operate the vibrator mechanism to generate vibrations having a vibration frequency corresponding to the frequency setting of the frequency selection signal and a vibration amplitude corresponding to the amplitude setting of the amplitude selection signal.

In a further aspect of the present disclosure, the invention is directed to a method for controlling an amplitude and a frequency of vibrations of a vibrator mechanism of a vibratory work machine. The method may include generating a frequency control signal having a characteristic corresponding to a frequency setting of a first input device selected from a plurality of discrete frequency settings, determining a vibration amplitude corresponding to an amplitude setting of a second input device selected from a plurality of discrete amplitude settings, and outputting at least the frequency control signal to a power source to cause the power source to operate a vibration mechanism of the vibratory work machine to generate vibrations having a vibration frequency corresponding to the frequency setting of the first input device and the vibration amplitude corresponding to the amplitude setting of the second input device.

Additional aspects of the invention are defined by the claims of this patent.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
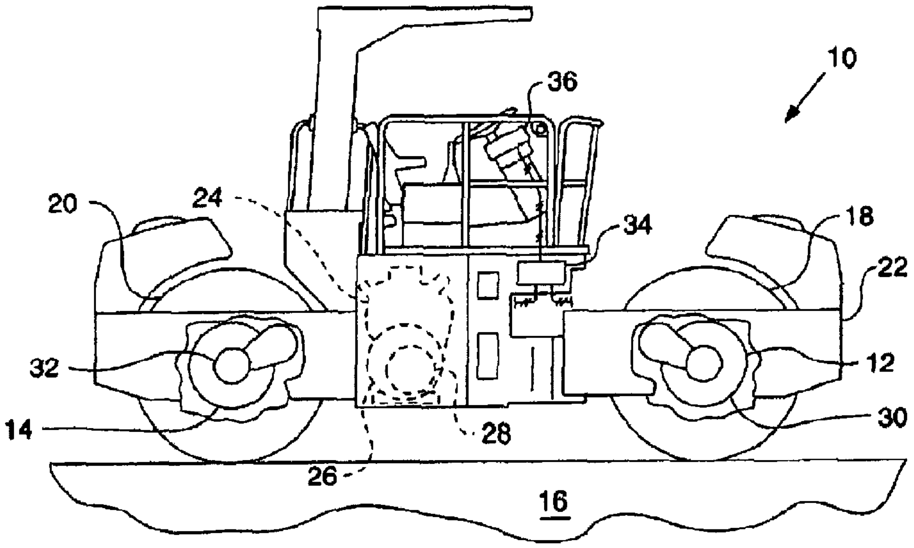
FIG. 1 is an exemplary side elevation view of a vibratory compactor having a automatic vibratory frequency selection in accordance with the present disclosure.

FIG. 1 is an exemplary side elevation view of a vibratory compactor 10 having front and rear vibrator mechanisms 12, 14, respectively. As is generally known, a work machine such as the vibratory compactor 10 shown in FIG. 1 may be used to increase the density of (i.e., compact) a freshly laid material 16 such as, for example, asphalt or other bituminous mixture, soil, gravel and the like. The vibratory compactor 10 may include a pair of compacting drums 18, 20 that surround the respective vibrator mechanisms 12, 14, and that are rotatably mounted to a main frame 22. The main frame 22 may also support an engine 24 that may be used to generate mechanical and/or electrical power for propelling the compactor 10. A pair of power sources 26, 28 may be connected to the engine 24 in a conventional manner or in any other suitable manner. The power sources 26, 28 may be electric generators, fluid pumps or any other source of power suitable for propelling the compactor 10, providing power to the vibrator mechanisms 12, 14, and providing power to mechanical subsystems, electrical systems and the like that are associated with the compactor 10.

The vibrator mechanisms 12, 14 may be operatively coupled to motors 30, 32, respectively. While each of the compacting drums 18, 20 is shown as having only one vibrator mechanism, additional vibrator mechanisms could be used in either or both of the drums 18, 20, if desired. Where the power sources 26, 28 provide electrical power, the motors 30, 32 may be electric motors such as, for example, direct current motors. Alternatively, where the power sources 26, 28 provide mechanical or hydraulic power, the motors 30, 32 may be fluid motors. In any case, the motors 30, 32 may be operatively coupled to the power sources 26, 28 via electrical wires or cables, relays, fuses, fluid conduits, control valves and the like (none of which are shown), as needed.

The compactor 10 may also include a controller, such as an electronic control module (ECM) 34 (an example of which is described in greater detail in connection with FIG. 7), that may be used to control the amplitude and the frequency of the vibrations produced by one or both of the vibrator mechanisms 12, 14. The controller 34 may be operatively coupled to an operator or user interface 36 that enables the user or operator of the compactor 10 to vary the characteristics of the vibrations produced by the vibrator mechanisms 12, 14, to set a desired vibration control mode, to determine which one of the compacting drums 18, 20 or if both of the compacting drums 18, 20 should be caused to vibrate, to view operational status or conditions associated with the compactor 10 and to provide any other functionality necessary for the operator to control and under the operation of the compactor 10. The user interface 36 may be connected to the controller 34 and to other elements, and devices of the compactor 10 via wires, optical fiber, wireless communication links (e.g. radio frequency, infrared, ultrasonic, etc.) or via any other suitable communication media.

It is important to recognize that, although the vibrator mechanism controller 34 is described herein in connection with the vibratory compactor 10 shown in FIG. 1, which is shown by way of example to be a double drum compactor, any other compactor configuration could be used instead. Furthermore, the vibrator mechanism controller 34 described herein may be more generally applied to controlling vibrations produced by other types of vibratory work machines, equipment, devices, mechanisms and the like, without departing from the scope and the spirit of the present disclosure.

Figure 2:
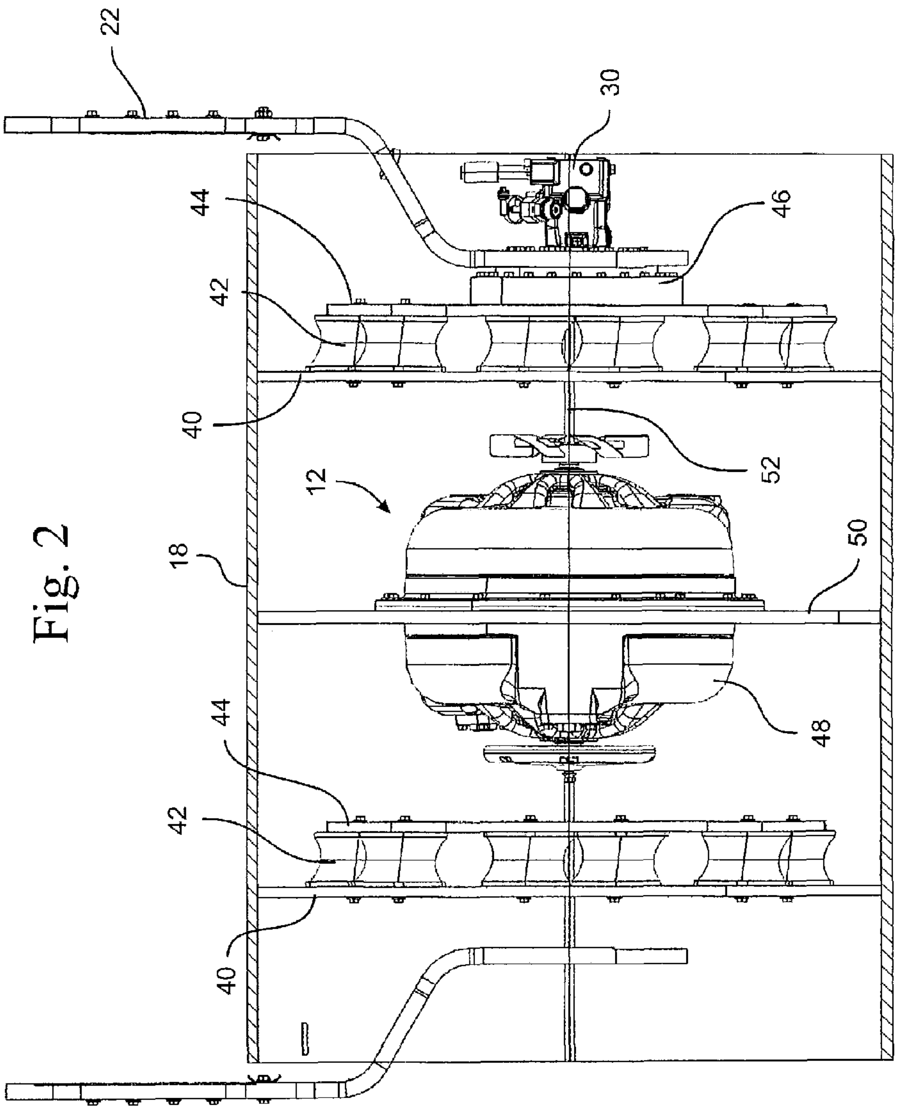
FIG. 2 is a front elevation view of a drum of the vibratory compactor of FIG. 1 with the drum shown in section.

FIG. 2 is an exemplary front view of the compacting drum 18 of the vibratory compactor 10 shown in FIG. 1. The drum 18 is shown in section to reveal the components disposed therein. The drum 18 may be hollow and have a pair of support plates 40 attached to an inner surface of the drum 18. The support plates 40 may be connected via a vibration dampening mechanism, such as rubber mounts 42, to mounting plates 44. The mounting plates 44 may in turn be rotatably mounted to the main frame 22 via any appropriate rotational bearing mechanisms 46 to allow the drum 18 to rotate relative to the main frame to move the vibratory compactor 10 over the material 16. The rubber mounts 42 and bearing mechanism 46 isolate the drum 18 from the main frame 22 so that vibrations caused by the material 16 and the vibrator mechanism 12 are not transmitted through the main frame 22 to the other components of the compactor 10. The mounting plates 44 and/or the support plates 40 may be operatively connected to the engine 24 and/or one of the power sources 26, 28 by a drive mechanism (not shown) configured to rotate the drum 18 to propel the compactor 10.

The vibrator mechanism 12 shown in FIG. 2 may be the same type of mechanism as the vibrator mechanism 14 within the rear drum 20. Alternatively, other vibrator mechanisms capable of producing multiple amplitudes may be implemented in the drums 18, 20. Generally speaking, the vibrator mechanism 12 may generate vibrations of the drum 18 having varying amplitudes. More specifically, the vibrator mechanism 12 includes structures that enable the relative positions or relative phase of eccentric weights to be varied from a minimum to a maximum difference, thereby varying the magnitude of the imbalance and the vibrational forces produced by rotation of the eccentric weights about their axes. To that end, the vibrator mechanism 12 may include an outer housing 48 connected to a mounting plate 50 attached to the inner surface of the drum 18 such that the outer housing 48 rotates with the drum 18 is the compactor 10 traverses the material 16. The motor 30 may be attached to the main frame 22 and have a drive shaft 52 extending through an opening of the outer housing 48 and being operatively connected to the internal components of the vibrator mechanism 12.

Figure 3:
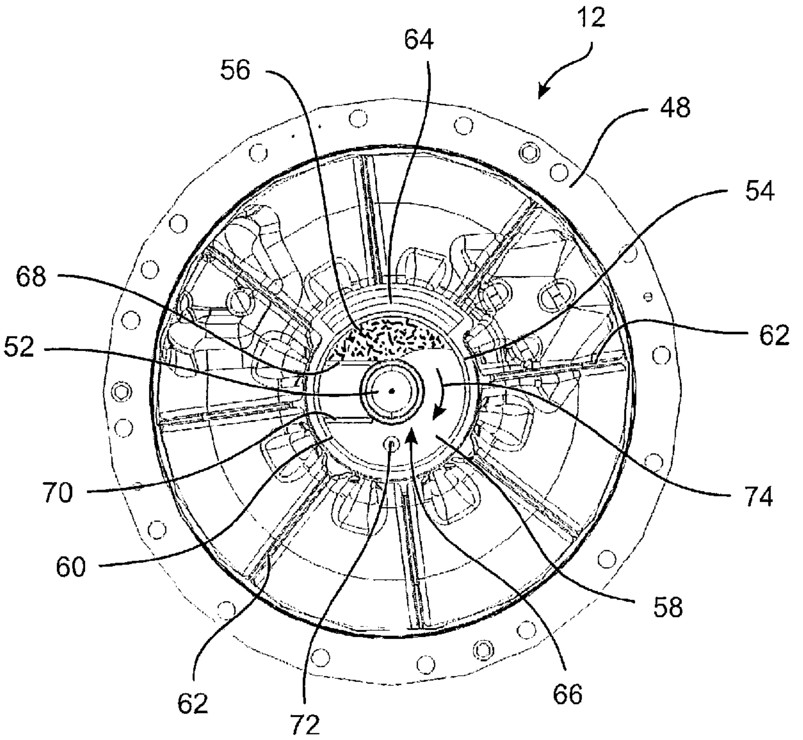
FIG. 3 is a side view of a vibrating mechanism of the drum of FIG. 2 with a portion of the outer housing removed and rotating in a clockwise direction.

FIG. 3 illustrates one exemplary embodiment of the vibrator mechanism 12 with a portion of the outer housing 48 removed to reveal the internal components of the vibrator mechanism 12. The vibrator mechanism 12 may be generally similar to the mechanism illustrated in the Stanton patent. As shown in FIG. 3, the vibrator mechanism 12 may include a sealed, hollow inner housing 54 containing a movable weighting material 56 such as metal shot, steel balls, liquid metal, sand or other shiftable ballast material. The inner housing 54 may include circular end walls 58 (foreground end wall 58 removed for clarity) mounted on the shaft 52. A circumferential outer wall 60 may be secured to the outer peripheral edges of the end walls 58 and/or to radial ribs 62 of the outer housing 48. A fixed eccentric weight 64 may be attached to an outer surface of the outer wall 60 for rotation with the shaft 52 and the inner housing 54.

The end walls 58 and the outer wall 60 may combine to define a cavity 66 therein that is concentric with the axis of rotation of the shaft 52 and has the movable weighting material 56 disposed therein. Less than half of the cavity 66 may be filled with the movable weighting material 56 so that the material 56 may shift within the cavity 66. Interior walls 68, 70 located in the cavity 66 may be secured to opposite sides of the shaft 52 and extend along separate chord lines to the outer wall 60. The interior walls 68, 70 may act as stops for the movable weighting material 56 as the material shifts within the cavity 66 between positions proximate to and remote from the eccentric weight 64. One of the end walls 58 may have a normally closed port or opening 72 through which the movable weighting material 56 is introduced into cavity 66. Alternatively, the interior walls 68, 70 can be substantially radial walls that extend from shaft 52 to the outer wall 60.

Figure 4:
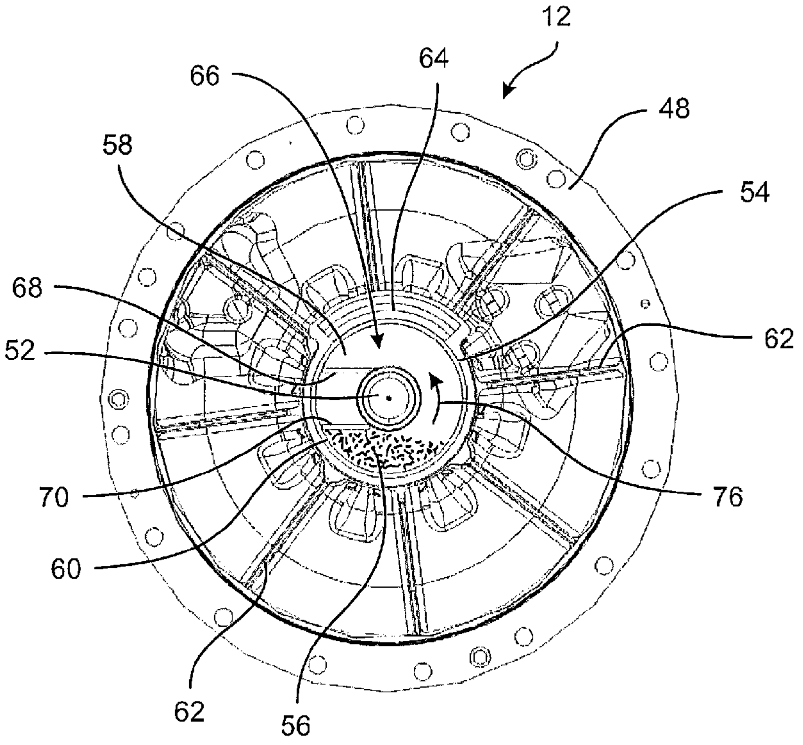
FIG. 4 is a side view of the vibrating mechanism of FIG. 3 rotating in a counterclockwise direction.

When the vibrator mechanism 12 is actuated, the maximum vibration amplitude may achieved by rotating the shaft 52 in the clockwise direction as indicated by the arrow 74 as shown in FIG. 3. The motor 30 may drive the shaft 52 independent of the speed of rotation of the drum 18 and outer housing 48. The movable weighting material 56 may move into the portion of the cavity bounded by the interior wall 68 and against the outer wall 60. The accumulated movable weighting material 56 may be located adjacent the eccentric weight 64, thereby increasing the distance of the centroid of the combined mass of the weighting material 56 and the eccentric weight 64 from the shaft 52. This outward shift of the cumulative eccentric mass increases the amplitude of the vibration of the shaft 52 and the vibrator mechanism 12. The rotation of the shaft 52 in the counterclockwise direction as indicated by an arrow 76 in FIG. 4 causes the movable weighting material 56 to accumulate in the portion of the cavity 66 bounded by the interior wall 70. As shown, the portion of the cavity 66 is diametrically opposite the eccentric weight 64 whereby the movable weighting material 56 counterbalances the eccentric weight 64 and moves the centroid of the combined mass closer to the shaft 52. The shift of the centroid reduces the amplitude of the vibration of the shaft 52 and the vibrator mechanism 12.

Given this arrangement, the motor 30 may function to vary both the amplitude and frequency of the vibrations generated by the vibrator mechanism 12. As discussed above, the amplitude of the vibrations will change based on the direction of the rotation of the motor 30. Additionally, the frequency characteristic of the vibrations produced by the vibrator mechanism 12 may be varied by changing the rotational speed of the drive shaft 52 and, correspondingly, the movable weighting material 56 and the eccentric weights 64, with the frequency of the vibrations produced increasing as the rotational speed of the eccentric weight increases.

Figure 5:
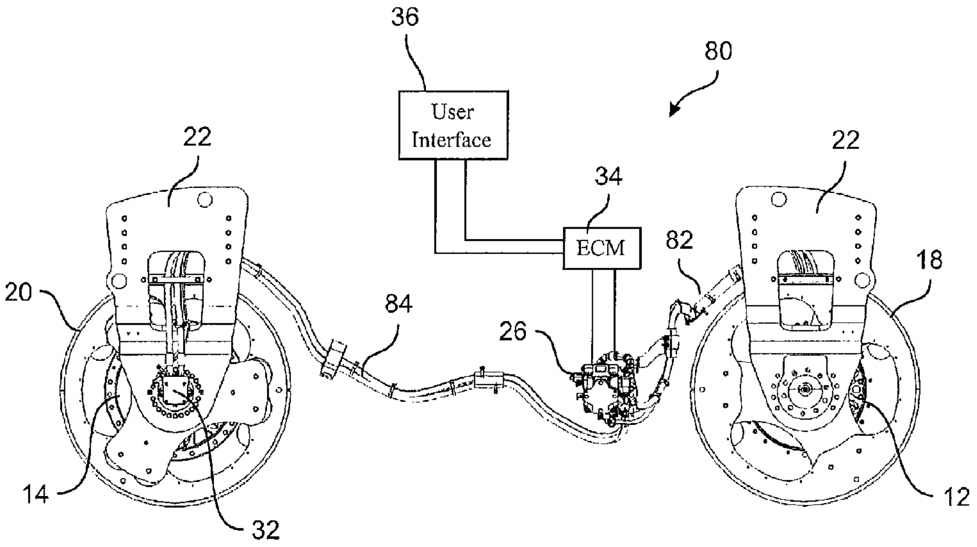
FIG. 5 is a schematic side view of an embodiment of a vibration frequency control system implemented in the vibratory compactor of FIG. 1.

FIG. 5 illustrates one embodiment of a vibratory frequency selection system 80 in accordance with the present disclosure. The system 80 may include components previously described for the vibratory compactor 10 of FIG. 1. Consequently, the drums 18, 20 may be rotatably mounted to the main frame 22 and have corresponding vibrator mechanisms 12, 14 disposed therein. The vibrator mechanisms 12, 14 may be driven by the corresponding motors 30, 32. In the illustrated embodiment, the power source 26 that may be implemented, for example, in the form of a hydrostatic closed loop pump having proportional control. Correspondingly, the motors 30, 32 may be hydraulic motors that convert hydraulic pressure and flow from the pump 26 into torque and angular displacement (rotation) of the drive shafts 52.

The pump 26 may be connected to the motors 30, 32 by pairs of hoses 82, 84, respectively, to provide closed loop fluid flow necessary to drive the motors 30, 32. Using the motor 30 as an example, the pump 26 may direct fluid flow through one of the hoses of the pair of hoses 82 to the motor 30 to rotate the motor 30 in one direction and a have the fluid return to the pump 26 through the opposite hose of the pair 82. The rotation of the motor 30 may then be reversed by causing the pump 26 to direct fluid flow through the opposite hose. The pump 26 may be operatively connected to the controller or ECM 34 to receive control signals causing the pump 26 to output fluid flow to the drive motors 30, 32 in a desired direction and with a desired amount of hydraulic pressure and fluid flow to cause vibrations of the vibrator mechanisms 12, 14 with a particular frequency and amplitude. The control signals output by the ECM 34 may be determined by input signals received at the ECM 34 from the user interface 36.

Figure 6:
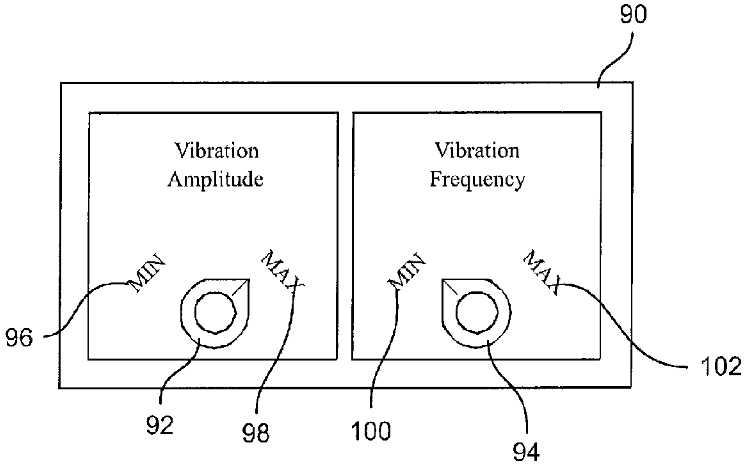
FIG. 6 is a diagrammatic view of a user interface panel that may be implemented in the vibratory compactor of FIG. 1.

The user interface 36 may provide input devices allowing an operator of the vibratory compactor 10 to select the vibration frequency and amplitude. FIG. 6 is an exemplary diagrammatic view of a vibration control panel 90 of the user interface 36 that may be used by the operator of the compactor 10. The vibration control panel 90 may be used as a man-machine interface portion of the user interface 36. The vibration control panel 90 may include user adjustable input devices in the form of a vibration amplitude control knob 92 and a vibration frequency control knob 94. In the illustrated embodiment, each of the control knobs 92, 94 may have two discrete settings allowing for minimum and maximum vibration amplitudes, and minimum and maximum vibration frequencies. Consequently, the vibration control panel may further include minimum and maximum vibration amplitude indicators 96, 98, respectively, and minimum and maximum vibration frequency indicators 100, 102, respectively, providing the operator with visual indications as to where to set the control knobs 92, 94. As illustrated in based on the positions of the control knobs 92, 94, the ECM 34 may cause the pump 26 to operate the vibrator mechanisms 12, 14 at the maximum vibration amplitude and minimum vibration frequency. In addition to the vibration amplitude and frequency control knobs 92, 94, the vibrator control panel may include additional controls allowing the operator to turn the vibratory frequency selection system 80 on and off, and to determine whether the front vibrator mechanism 12, rear vibrator mechanism 14, or both, are operable when the system 80 is operating. Such controls may also be connected to the ECM 34, which may include the corresponding logic for controlling the pump 26.

It should be recognized that while one manner of implementing the vibration control panel 90 is shown in FIG. 6, many other possible configurations may be used instead without departing from the scope and the spirit of the present disclosure. For example, textual and/or graphical information provided on the vibration control panel 90 may be printed on the surface of the control panel 90 using, for example, a silk-screening technique, pad printing, printed labels, etc., or some or all of the textual and/or graphical information may be molded, etched or otherwise permanently embedded in surface of the control panel 90. For example, the vibration amplitude and frequency control knobs 92, 94 may be replaced with linear sliders, keypads and the like. Still further, the entire vibration control panel 90 may be implemented using an electronic display or video display such as, for example, a plasma display, a liquid crystal display, a cathode ray tube, unlike. If such a video display is used to implement the control panel 90, backlighting may be provided and/or a touch screen may be used to receive user inputs. In the case where a video display and a touch screen are used for the control panel 90, the control knobs 92, 94 and the indicators 96-102 may be displayed as graphical representations with which a user may interact via the touch screen. Touch screen/video display interfaces are well known and, thus, will not be described in greater detail herein.

Figure 7:
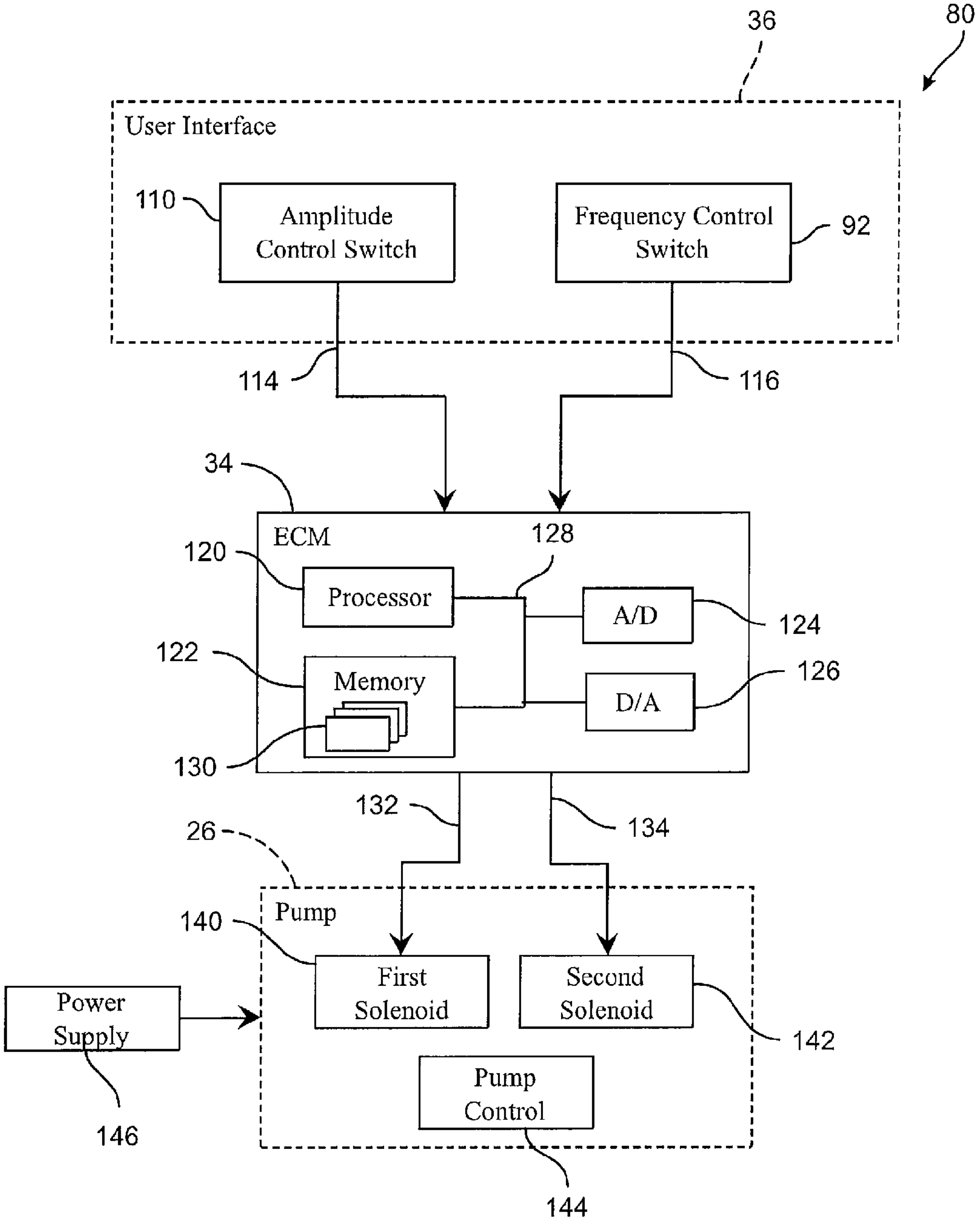
FIG. 7 is a schematic block diagram of electrical components of the vibratory compactor of FIG. 1.

FIG. 7 is an exemplary schematic block diagram of the electrical components of the vibratory frequency selection system 80 that may be used to control the vibration frequency and amplitude of the vibratory compactor 10. Generally speaking, the system 80 may be used for controlling the pump 26 to generate desired vibration amplitude and frequency combinations at the vibrator mechanisms 12, 14. As shown in FIG. 7, the system 80 may include the user interface 36 having user adjustable vibration amplitude and frequency input devices (control knobs 92, 94) that generate output signals intended for the ECM 34. The ECM 34 may be programmed to use the output signals from the user interface 36 to control signals for the pump 26, and to output the control signals to the pump 26 to generate the desired vibrations at the vibrator mechanisms 12, 14.

The user interface 36 shown in FIG. 7 may include the electronic elements underlying the control panel 90 shown in FIG. 6. The user interface 36 may include an amplitude control switch 110 that may be operatively connected to the amplitude control knob 92, and a frequency control switch 112 operatively connected to the frequency control knob 94. The control switches 110, 112 may be capable of providing amplitude selection and frequency selection signals, respectively, corresponding to the positions of the corresponding control knobs 92, 94, and may be implemented using rocker switches, toggle switches, membrane switches, slide switches, or any other suitable switch configuration. The control switches 110, 112 may further be operatively connected to the ECM 34 via an amplitude switch link 114 and frequency switch link 116, respectively, to transmit the selection signals to the ECM 34. The switch links 114, 116 may be hardwired link, data buses, wireless links or the like using any suitable communication protocol.

The programmable controller or ECM 34 may include a processor 120, a memory 122, an analog-to-digital converter 124 and a digital-to-analog converter 126, all of which may be communicatively coupled via a data bus 128. The memory 122 may have one or more software routines 130 stored thereon that may be executed or preformed by the processor 120. The components 120-130 illustrated in the ECM 34 in FIG. 7 are exemplary, and those skilled in the art will understand that the ECM 34 may have the components necessary to perform the functionality described herein, such as a communications module that may operate in conjunction with the converters 124, 126 to receive the amplitude and frequency selection signals on the switch links 114, 116, and to output pump control signals to the pump 26 on first and second pump control signal links 132, 134. The signals on the links 114, 116, 132, 134 may be resistance signals, voltage signals, current signals, switch contacts, or any other type of signal or output that may be used, for example, to communicate control information between the control switches 110, 112 and ECM 34, and between the ECM 34 and the pump 26.

In the embodiment of the pump 26 illustrated in FIG. 7, the pump 26 may include a first solenoid 140, a second solenoid 142 and pump control elements 144. In the hydrostatic pump 26, each of the solenoids 140, 142 interacts with the pump control elements 144 to control the flow of the fluid out of the pump 26 in one direction. Consequently, actuation of the first solenoid 140 causes the pump control elements 144 to output hydraulic pressure and fluid to one of the hoses of each pair of hoses 82, 84 to cause the motors 30, 32 to rotate the drive shafts 52 in one direction. Actuation of the second solenoid 142 causes the pump control elements 144 to output fluid in the other of the hoses of the pair 82, 84 to cause the motors 30, 32 to rotate in the opposite direction. When neither solenoid 140, 142 is actuated, no fluid flow is output from the pump 26 even though the pump control elements 144 may be operational. Power may be supplied to the elements of the pump 26 by a power supply 146 of the compactor 10 which may be, for example, a battery, alternator or any other power supply provided in the vibratory compactor 10.

The first and second pump control signal links 132, 134 form the interface between the ECM 34 and the pump 26. The first pump control signal link 132 may be operatively connected to the first solenoid 140, and the second pump control signal link 134 may be operatively connected to the second solenoid 142. As such, control signals transmitted over the first control signal link 132 cause the first solenoid 140 to actuate to generate fluid flow from the pump 26 to the motors 30, 32 and cause rotation resulting in one of the vibration amplitudes. When control signals are transmitted over the second control signal link 134, the second solenoid 142 actuates to cause rotation of the motors 30, 32 in the opposite direction and to produce the other available vibration amplitude as the weighting material 56 shifts within the inner housing 54. Consequently, the amplitude of the vibrations generated by the vibrator mechanisms 12, 14 is determined based on the control signal link 132 or 134 upon which a pump control signal is transmitted from the ECM 34 to the pump 26. The frequency of the vibrations, on the other hand, may be determined based on the magnitude of the pump control signal transmitted from the ECM 34 to the pump 26. If the pump 26 is implemented with proportional control, the output hydraulic pressure and fluid flow will be proportional to the magnitude of the pump control signal received by one of the solenoid 140, 142 over the control signal links 132, 134. Based on this, the ECM 34 may be configured to receive amplitude and frequency selection signals from the control switches 110, 112 over the switch links 114, 116, to determine the amplitude and frequency of the vibrations generated at the vibrator mechanisms 12, 14 based on the selection signals received over the switch links 114, 116, and to output an appropriate pump control signal to the pump 26 over either the first control signal link 132 or the second control signal link 134.

Figure 8:
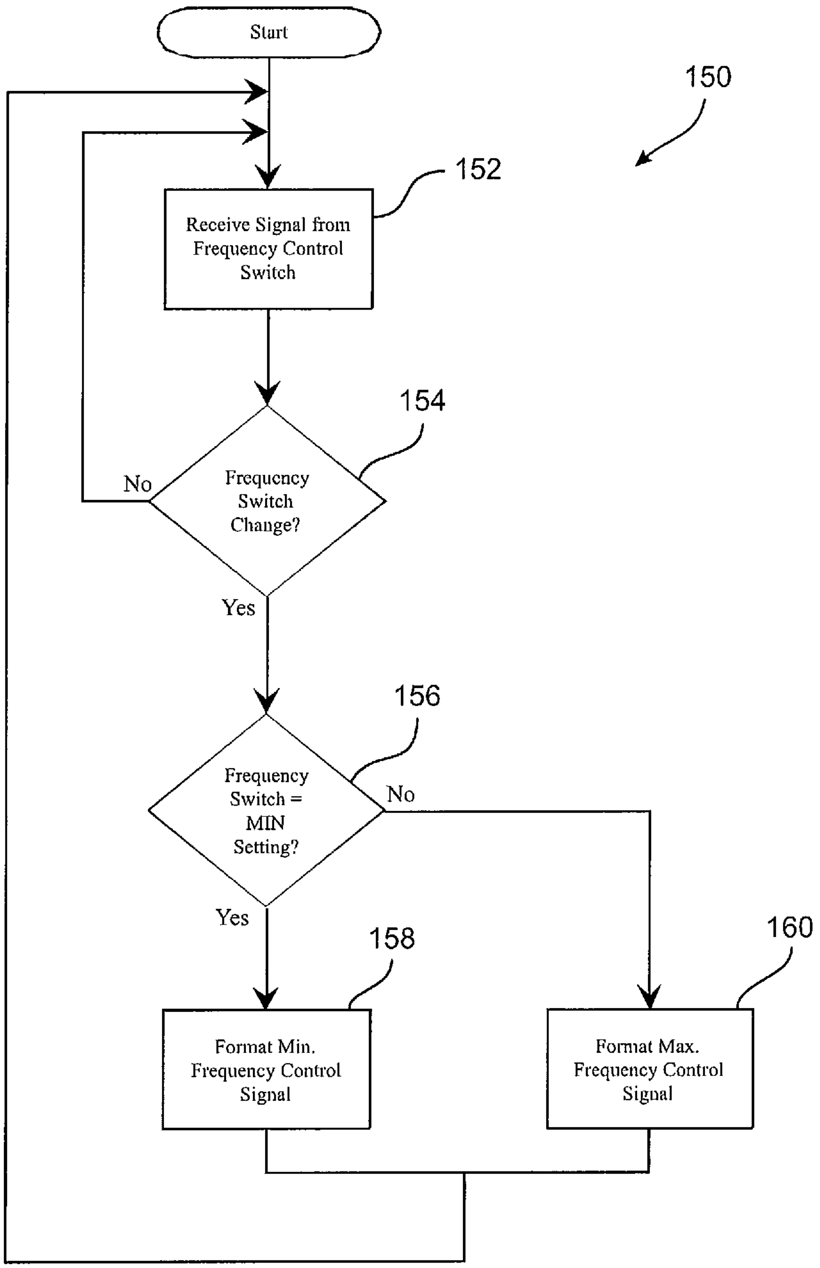
FIG. 8 is a flow diagram of a frequency control signal generation routine.

FIG. 8 illustrates one embodiment of a frequency signal generation routine 150 that may be implemented in the vibratory frequency selection system 80 of the present disclosure. The routine 150 may begin at a block 152 wherein the ECM 34 may receive a frequency selection signal from the frequency control switch 112 over the frequency switch link 116. Depending on the configuration, the frequency control switch 112 may constantly transmit a frequency control signal indicative of the position of the frequency control knob 94, or may transmit the frequency control signal intermittently at predetermined time intervals or upon detection of movement of the frequency control knob 94 from one setting to the opposite setting. Upon receipt of the frequency selection signal from the frequency control switch 112, control may pass to a block 154 wherein the ECM 34 may determine whether the value of the frequency selection signal from the frequency control switch 112 has changed from the previously transmitted value. If the value of the selection signal has not changed, the position of the frequency control knob 94 has not changed, and control passes back to the block 152 to continue receiving selection signals from the frequency control switch 112.

If the value of the frequency selection signal from the frequency control switch 112 has changed from the previously received value of the signal, control may pass to a block 156 wherein the frequency selection signal from the frequency control switch 112 may be evaluated to determine whether the frequency control switch 112 is now at a first or minimum frequency setting. If the selection signal is equal to the minimum frequency setting, control may pass to a block 158 wherein the ECM 34 may format a minimum frequency control signal to be output to the pump 26. If the selection signal is not equal to the minimum frequency setting, control may instead pass to a block 160 wherein the ECM 34 may format a maximum frequency control signal for the pump 26. Once formatted, the frequency control signal may be output to the pump 26 as determined by a frequency signal output routine 170 such as that described more fully below, and control in the routine 150 may pass back to block 152 for continued monitoring of the frequency selection signal from the frequency control switch 112.

Various options exist for the manner in which the ECM 34 converts the frequency selection signal from the frequency control switch 112 into a pump frequency control signal. In one embodiment, the ECM 34 may be programmed at the factory to output a specific pump frequency control signal for a specific value of the frequency selection signal. In this manner, the pump 26 and, correspondingly, the motors 30, 32 and vibrator mechanisms 12, 14 may operate at only two specific frequencies regardless of the material 16 over which the compactor 10 travels unless the ECM 34 is reprogrammed. Alternatively, the frequency control knob 94 and frequency control switch 112 may have one or more intermediate frequency settings between the minimum and maximum settings, with the ECM 34 being programmed to interpret the frequency selection signals and generate appropriate pump frequency control signals. As a further alternative, a desired range of frequencies may be achievable such that the compactor 10 may operate with appropriate vibration frequencies for different types of materials. For example, the ECM 34 may be programmed with minimum and maximum frequencies for multiple types of material 16 on which the compactor 10 may be used, such as asphalt, soil and gravel. The user interface 36 may be provided with an additional input device allowing the operator to select the material over which the compactor 10 will be traveling, and an additional link may be provided between the user interface 36 and the ECM 34 to transmit information regarding the setting of the input device to the ECM 34. Logic may be added to the frequency signal generation routine 150 such that the ECM 34 formats appropriate frequency control signals based on the various combinations of settings of the frequency control switch 112 and the material selection switch. Additional mechanisms for determining and formatting a discrete number of frequency control signals will be apparent to those skilled in the art, and are contemplated by the inventors as having use in vibratory compactors 10 in accordance with the present disclosure.

Figure 9:
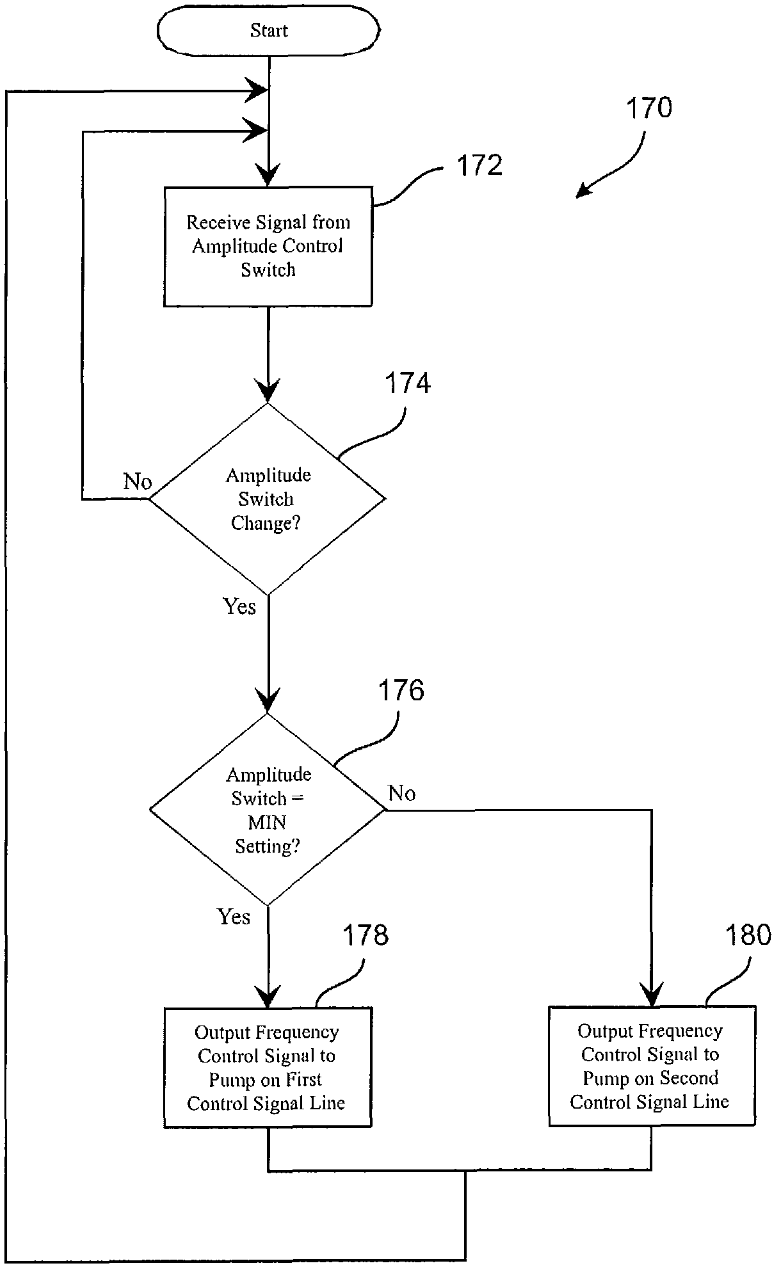
FIG. 9 is a flow diagram of a frequency control signal output routine.

FIG. 9 illustrates an embodiment of a frequency signal output routine 170 that may be implemented in the system 80 to control the fluid flow out of the pump 26 and, consequently, the amplitude of the vibrations created by the vibrator mechanisms 12, 14. The routine 170 may begin at a block 172 wherein the ECM 34 may receive an amplitude selection signal from the amplitude control switch 110 over the amplitude switch link 114. As with the frequency control switch 112, the amplitude control switch 110 may constantly or intermittently transmit an amplitude selection signal indicative of the position of amplitude control knob 92 over the amplitude switch link 114. Upon receipt of the amplitude selection signal from the amplitude control switch 110, control may pass to a block 174 wherein the ECM 34 may determine whether the value of the amplitude selection signal from the amplitude control switch 110 has changed from the previously transmitted value. If the value of the amplitude selection signal has not changed, the position of the amplitude control knob 92 has not changed, and control passes back to the block 172 to continue receiving signals from the amplitude control switch 110.

If the value of the amplitude selection signal from the amplitude control switch 110 has changed from the previously received value of the selection signal, control may pass to a block 176 wherein the amplitude selection signal from the amplitude control switch 110 may be evaluated to determine whether the amplitude control switch 110 is at a first or minimum amplitude setting. If the selection signal is equal to the minimum amplitude setting, control may pass to a block 178 wherein the ECM 34 may cause the frequency control signal formatted in routine 150 to be output to the pump 26 on the first control signal link 132. By doing so, the frequency control signal may be received at the pump 26 and cause the first solenoid 140 to actuate, and thereby cause the vibrator mechanisms 12, 14 to rotate in the direction resulting in minimum amplitude vibrations. If the amplitude selection signal is not equal to the minimum amplitude setting, control may instead pass to a block 180 wherein the ECM 34 may cause the frequency control signal formatted in routine 150 to be output to the pump 26 on the second control signal link 134 to actuate the second solenoid 142 and generate maximum amplitude vibrations at the vibrator mechanisms 12, 14 due to rotation of the motors 30, 32 in the opposite direction. Once the frequency control signal is output on one of the control signal links 132, 134, control may pass back to block 172 to monitor the amplitude selection signal on the amplitude switch link 114 from the amplitude control switch 110.

INDUSTRIAL APPLICABILITY

Vibrator mechanisms, such as those used within vibratory compactors, typically require frequent adjustment of the amplitude and the frequency of the vibrations produced by the mechanism and/or the device or machine in which the vibrator mechanism operates. For example, in the case of a vibratory compactor, the changing characteristics of a material being compacted, the job-to-job differences in compacted materials, etc. may affect the vibration amplitude and vibration frequency needed.

Generally speaking, with the vibratory frequency selection system 80 described herein, an operator of a vibrator mechanism, device or work machine may be provide with increased flexibility in applying the vibrations having desired frequency and amplitude characteristics to the material 16 being compacted by the vibratory compactor 10. The operator is provided with additional discrete combinations of vibration frequencies from which to choose to match the vibrations to the material 16. In providing independent control of both the amplitude and frequency of the vibrations, at least two discrete frequency settings may be available for each amplitude setting, and vice versa.

The illustrated embodiment of the selection system 80 provides two settings each for the vibration amplitude and frequency. This configuration yields four discrete vibration amplitude and frequency combinations. The operator's flexibility may be further enhanced in alternative embodiments wherein additional discrete frequency settings are provided. As discussed above, the hydrostatic pump 26 may provide proportional control such that the output hydraulic pressure and fluid flow is proportional to the input control signal received from the ECM 34. In view of this, the frequency control knob 94 and the control switch 112 may be configured with more than two discrete positions, and the frequency signal generation routine 150 of the ECM 34 may be programmed to interpret additional values of the frequency switch signal and generate corresponding frequency control signals. Knowing the amplitudes generated by the vibrator mechanisms 12, 14, the ECM 34 may be programmed so that the output frequency control signals do not cause the vibrator mechanisms to create sustained vibrations at resonant frequencies that may cause decoupling and/or vibratory overload conditions within the vibrator mechanisms 12, 14 or the compactor 10.

Numerous other modifications and alternative embodiments of the invention will be apparent to those skilled in the art in view of the foregoing description. As mentioned above, the control knobs 92, 94 and control switches 110, 112 of the user interface 36 may be implemented in the form of any appropriate input devices allowing an operator to select from a plurality of available input options, and being capable of communicating the operator's selection to the ECM 34. As a further example, the hydrostatic closed loop pump 26 and fluid motors 30, 32 discussed in the illustrated embodiment may be replaced by other combinations of a power source and motors capable of converting frequency and amplitude control signals output by the ECM 34 into rotation of the drive shafts 52 in the direction and with a frequency corresponding to the settings of the control knobs 92, 94. With alternative power sources and motors, it may be possible to implement the functionality for determining the direction of rotation of the drive shafts 52 in the power source and/or motor, and to provide a single control signal link from the ECM 34 to the power source and transmit a control signal formatted with information necessary to control the direction of rotation of the drive shafts 52. Still further, the vibrator mechanisms 12, 14 may be replaced by other types of mechanisms capable of producing varying vibration amplitudes based on the direction of rotation of the drive shafts 52. Other aspects and features of the present invention, and an identification of variations thereof, can be obtained from a study of the drawings, the disclosure, and the appended claims.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, not impossible. Numerous alternative embodiments could be implemented, using either current technology or technology developed after the filing date of this patent, which would still fall within the scope of the claims defining the invention.

What is claimed is:

1. A controller for use in a vibratory work machine, comprising:

a frequency signal generation routine that includes receiving a frequency selection signal from a user adjustable frequency input device indicative of a setting of the frequency input device at one of a plurality of discrete frequency settings, and generating a frequency control signal having a characteristic corresponding to a frequency setting of the frequency selection signal; and a frequency signal output routine that includes receiving an amplitude selection signal from a user adjustable amplitude input device indicative of a setting of the amplitude input device at one of a plurality of discrete amplitude settings, determining an amplitude setting of the amplitude input device based on the received amplitude selection signal, outputting at least the frequency control signal from the controller to a power source of the vibratory work machine in a manner to cause a vibrator mechanism of the vibratory work machine to rotate in a first direction to generate vibrations having a vibration frequency corresponding to the frequency setting of the frequency selection signal and a first vibration amplitude in response to determining that the amplitude setting of the amplitude selection signal is equal to a first discrete amplitude setting, and outputting at least the frequency control signal from the controller to the power source in a manner to cause the vibrator mechanism to rotate in a second direction to generate vibrations having a vibration frequency corresponding to the frequency setting of the frequency selection signal and a second vibration amplitude in response to determining that the amplitude setting is equal to a second discrete amplitude setting, wherein the frequency input device and the amplitude input device are independently adjustable.

2. The controller of claim 1, wherein the frequency input device has two discrete frequency settings.

3. The controller of claim 1, wherein the amplitude input device has two discrete amplitude settings.

4. The controller of claim 1, wherein the controller is operatively connected to the power source by a first control signal link and a second control signal link, and wherein the frequency signal output routine includes outputting the frequency control signal from the controller to the power source on the first control signal link in response to determining that the amplitude setting is equal to the first discrete amplitude setting, and outputting the frequency control signal from the controller to the power source on the second control signal link in response to determining that the amplitude setting is equal to the second discrete amplitude setting.

5. The controller of claim 1, wherein the power source of the vibratory work machine is a hydrostatic pump.

6. A vibratory frequency selection system for a vibratory work machine, comprising:

a frequency input device for selecting from a plurality of discrete frequency settings and generating a frequency selection signal indicative of a frequency setting of the frequency input device;

an amplitude input device for selecting from a plurality of discrete amplitude settings and generating an amplitude selection signal indicative of an amplitude setting of the amplitude input device, wherein the frequency input device and the amplitude input device are independently adjustable;

a vibrator mechanism operative connected to the power source; and a controller operative connected to the frequency input device, the amplitude input device and the power source, wherein the controller is configured to receive the frequency selection signal from the frequency input device and to generate a frequency control signal having characteristic corresponding to the frequency setting of the frequency selection signal, wherein the controller is configured to receive the amplitude selection signal from the amplitude input device and to determine a vibration amplitude corresponding to the amplitude setting of the frequency selection signal, wherein the controller is configured to output at least the frequency control signal to the power source in a manner to cause the power source to operate the vibrator mechanism to rotate in a first direction to generate vibrations having a vibration frequency corresponding to the frequency setting of the frequency selection signal and a first vibration amplitude in response to determining that the amplitude setting of the amplitude selection signal is equal to a first discrete amplitude setting, and wherein the controller is configured to output at least the frequency control signal to the power source in a manner to cause the power source to operate the vibrator mechanism to rotate in a second direction to generate vibrations having a vibration frequency corresponding to the frequency setting of the frequency selection signal and a second vibration amplitude in response to determining that the amplitude setting of the amplitude selection signal is equal to a second discrete amplitude setting.

7. The vibratory frequency selection system of claim 6, wherein the frequency input device has two discrete frequency settings.

8. The vibratory frequency selection system of claim 6, wherein the amplitude input device has two discrete amplitude settings.

9. The vibratory frequency selection system of claim 6, wherein the controller is operatively connected to the power source by a first control signal link and a second control signal link, wherein the controller is configured to output the frequency control signal to the power source on the first control signal link in response to determining that the amplitude setting is equal to the first discrete amplitude setting, and to output the frequency control signal to the power source on the second control signal link in response to determining that the amplitude setting of the second input device is equal to the second discrete amplitude setting.

10. The vibratory frequency selection system of claim 9, wherein the power source of the vibratory work machine is a hydrostatic pump, wherein outputting the frequency control signal from the controller to the hydrostatic pump on the first control signal link causes the hydrostatic pump to output a first fluid flow to cause the vibrator mechanism to rotate in the first direction to generate vibrations having the vibration amplitude corresponding to the first discrete amplitude setting, and wherein outputting the frequency control signal from the controller to the hydrostatic pump on the second control signal link causes the hydrostatic pump to output a second fluid flow to cause the vibrator mechanism to rotate in the second direction to generate vibrations having the vibration amplitude corresponding to the second discrete amplitude setting.

11. A method for controlling an amplitude and a frequency of vibrations of a vibrator mechanism of a vibratory work machine, comprising:

generating a frequency control signal having a characteristic corresponding to a frequency setting of a frequency input device selected from a plurality of discrete frequency settings;

determining a vibration amplitude corresponding to an amplitude setting of an amplitude input device selected from a plurality of discrete amplitude settings, wherein the frequency input device and the amplitude input device are independently adjustable;

outputting at least the frequency control signal to a power source in a manner to cause the power source to operate a vibration mechanism of the vibratory work machine to rotate in a first direction to generate vibrations having a vibration frequency corresponding to the frequency setting of the frequency input device and a first vibration amplitude corresponding to the amplitude setting of the amplitude input device in response to determining that the amplitude setting is equal to a first discrete amplitude setting; and outputting at least the frequency control signal to a power source in a manner to cause the power source to operate the vibration mechanism to rotate in a second direction to generate vibrations having a vibration frequency corresponding to the frequency setting of the frequency input device and a second vibration amplitude corresponding to the amplitude setting of the amplitude input device in response to determining that the amplitude setting is equal to a second discrete amplitude setting.

12. The method of claim 11, wherein the frequency input device has two discrete frequency settings.

13. The method of claim 11, wherein the amplitude input device has two discrete amplitude settings.

14. The method of claim 11, wherein the power source has a first control signal link and a second control signal link, the method comprising:

outputting the frequency control signal to the power source on the first control signal link in response to determining that the amplitude setting of the amplitude input device is equal to the first discrete amplitude setting; and outputting the frequency control signal to the power source on the second control signal link in response to determining that the amplitude setting of the amplitude input device is equal to the second discrete amplitude setting.

15. The method of claim 14, wherein the power source of the vibratory work machine is a hydrostatic pump, the method comprising:

causing the hydrostatic pump to output a first fluid flow to cause the vibrator mechanism to rotate in the first direction to generate vibrations having the vibration amplitude corresponding to the first discrete amplitude setting in response to receiving the frequency control signal at the hydrostatic pump on the first control signal link; and causing the hydrostatic pump to output a second fluid flow to cause the vibrator mechanism to rotate in the second direction to generate vibrations having the vibration amplitude corresponding to the second discrete amplitude setting in response to receiving the frequency control signal at the hydrostatic pump on the second control signal link.

* * * * *